(12) United States Patent
Waldron et al.

(10) Patent No.: US 6,253,275 B1
(45) Date of Patent: Jun. 26, 2001

(54) INTERRUPT GATING METHOD FOR PCI BRIDGES

(75) Inventors: Scott Waldron, Belmont; Jacques Ah Miow Wong, Santa Clara, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/199,967

(22) Filed: Nov. 25, 1998

(51) Int. Cl.[7] ..................................................... G06F 13/24
(52) U.S. Cl. ..................... 710/260; 710/261; 710/262; 710/263; 710/264; 710/266; 710/267; 710/126; 710/129
(58) Field of Search ............................. 710/126, 128, 710/129, 101, 240, 260, 22, 261, 262, 263, 264, 266, 267

(56) References Cited

U.S. PATENT DOCUMENTS

| | | | |
|---|---|---|---|
| 5,666,556 | * 9/1997 | Khandekar et al. ...................... 710/2 |
| 5,692,200 | * 11/1997 | Carlson et al. ...................... 710/262 |
| 5,832,243 | * 11/1998 | Seeman ................. 710/128 |
| 5,867,728 | * 2/1999 | Melo et al. ................ 710/8 |
| 5,881,253 | * 3/1999 | Seeman ................. 710/128 |

* cited by examiner

Primary Examiner—Rupal Dharia

(57) ABSTRACT

A method and apparatus for managing interrupt requests from devices on a subordinate bus is disclosed. An interrupt request storage area is provided on the bridge device to allow the bridge device to log and track interrupt requests. Once an interrupt request from an interrupting device is logged, all previous transactions from the interrupting device is allowed to complete while no further transactions from the interrupting device is allowed. All other devices operates normally during this time. Once the interrupt request is serviced, the interrupting device is allowed to resume normal operation. By providing a storage area to store the interrupt requests from devices on a subordinate bus, the unprocessed transactions in the bridge device and transactions from all other devices can be processed in an orderly manner.

11 Claims, 6 Drawing Sheets

INTERRUPT GATING METHOD FOR PCI BRIDGES

BACKGROUND OF THE INVENTION

1. Field of the Invention

The present invention generally relates to computer bus architectures and methods for transference of data, and, in particular, relates to bus bridge architectures for connecting two or more buses and for handling interrupt requests from a device on a subordinate bus to the central processing unit via the bus bridge device.

2. Description of the Prior Art

The disclosure herein utilizes Peripheral Component Interconnect (PCI) architecture for illustration purposes where the present invention and the embodiments thereof are not limited to this particular bus architecture. The PCI bus is a high performance 32-bit or 64-bit bus with multiplexed address and data lines. It is intended for use as an interconnect mechanism between highly integrated peripheral controller components, peripheral add-in boards, and processor/memory systems, providing high bandwidth throughput demanded by modern graphics-oriented operating systems such as Windows and OS/2. It is typically found in (but not limited to) IBM compatible personal computer systems. The specifications for the PCI bus standard is provided in the following documents and are incorporated herein by reference: PCI Local Bus Specification, revision 2.1; PCI-to-PCI Bridge Specification, revision 1.0; PCI System Design Guide, revision 1.0; and PCI BIOS Specification, revision 2.1. These documents are available from a consortium of industry partners known as the PCI Special Interest Group (SIG) and are collectively referred to as the PCI Specifications in this disclosure.

FIG. 1 shows one implementation of a PCI bus architecture. Here, the central processing unit (CPU) 10 is connected to a Host/PCI cache bridge 12 via a CPU local bus 14. The Host bridge 12 serves as a bridge to other buses, including a memory bus 16 connected to main memory 18 and a PCI bus 20. Via the Host bridge 12 and the PCI bus 20, the CPU is able to communicate with a number of peripheral devices, including an audio device 22, a motion video device 24 and its video memory 26, a SCSI host bus adapter 28 connecting several other SCSI devices, a LAN adapter 30, and a graphics adapter 32 and its video frame buffer 34. The PCI bus 20 can also communicate with other bus types through the use of a bus-specific bridge 36 and the corresponding bus 38.

Typical PCI bus implementations will support up to four add-in board connectors on the motherboard where the connectors are Micro Channel (MC)-style connectors. PCI expansion cards are designed with an edge connector insertable into the add-in board connectors on a motherboard.

However, a system incorporating a single bus has some limitations. For example, a bus can only support a limited number of expansion connectors due to the fact that a bus will not function properly when there are too many electrical loads (i.e. devices) placed on it. Moreover, the devices that populate a particular bus may not be able to co-exist in an efficient manner in a set-up where all the devices demand high levels of bus time—causing an overall degradation in the performance of the system.

These problems can be solved by adding one or more additional PCI buses into the stem and re-distributing the device population. The PCI Specifications provides the definition a PCI-to-PCI bridge device. This device can either be embedded as an integrated circuit on a bus or may be in the form of an add-in card that is pluggable in a PCI expansion connector. The PCI-to-PCI bridge provides a bridge from one PCI bus to another PCI bus, and it causes one electrical load on its host PCI bus. The new PCI bus can then support a number of additional PCI compatible devices and/or PCI expansion connectors. The electrical loading constraint is therefore solved because the loading constraint is on a per bus basis, not on a system basis. Of course, the power supply in the host system must be capable of supplying sufficient power for the load imposed by the additional devices residing on the new bus(es).

The PCI bridge provides a low latency path through which the processor may access PCI devices mapped anywhere in the memory space or the I/O address spaces. It also provides a high bandwidth path allowing PCI masters direct access to the main memory. The bridge may optionally include such functions as data buffering/posting and PCI central functions (e.g. arbitration). Terminology wise, the PCI bus closest to the host processor is referred to as the primary bus, and the PCI bus that resides behind a PCI-to-PCI bridge is referred to as a subordinate bus where the subordinate bus farthest from the host processor is called the secondary bus.

FIG. 2 illustrates an implementation of a PCI bus system with two PCI-to-PCI bridges connecting to two levels of PCI buses. Here, the CPU 50 is directly connected to the host bus 52. The system memory 54 is connected to the host bus 52 via system memory controller 56. A host-to-PCI bridge 58 establishes a connection between a host bus 52 and a downstream subordinate PCI bus 60 where two PCI devices 62 are connected to it. The subordinate PCI bus 60 further connects to another downstream PCI bus 64 via another PCI-to-PCI bridge 66. PCI bus 64, being the furthest from the host bus, is referred to as the secondary bus and is connected to two PCI devices 68. By using PCI-to-PCI bridges to connect to other PCI buses, architectures overcoming the problem of bus overloading and permitting the expansion of buses are created.

The PCI-to-PCI bridge functions as a traffic coordinator between two PCI buses. The bridge does not initiate a transaction on either PCI bus on its own. Its job is to monitor each transaction that is initiated on the two PCI buses and to decide whether or not to pass the transaction through to the opposite PCI bus. When the bridge determines that a transaction on one bus needs to be passed to the other bus the bridge must act as the target of the transaction on the originating bus and as the initiator of the new transaction on the destination bus. The fact that the bridge resides between the transaction initiator and the target is invisible to the initiator as well as to the target. In addition to determining if a transaction initiated on one bus must be passed through to the other, the bridge also supports additional functions as specified by the PCI Specifications. A bridge may also incorporate a set of device-specific, memory-mapped or IO-mapped registers that control its own functionality. In this case, it must recognize and permit accesses to these registers.

Referring to FIG. 3, the bridge 70 connecting two buses, the primary bus 72 and the secondary bus 74, stores the transactions initiated by devices #1, #2, and #3 (76, 78, 80) in a storage area referred to as data FIFO 82 and passes these transactions one at a time on to the primary bus 72. In handling interrupt requests, each device is assigned with a device number and when a device initiates an interrupt request, the request is passed to the bridge device 70 via a respective interrupt line, 86, 88, or 90. Here, the interrupt lines may be logical lines rather than physical lines. Once the bridge device 70 receives an interrupt request, the request is passed straight through to the primary bus 72 via another interrupt line 84.

When the CPU receives the interrupt request, the CPU, having the ability to arbitrate bus usage, holds all transactions from all devices in order to service this request. To service this request from a device on a subordinate bus, the CPU generally would allow all transactions in the bridge data FIFO to complete or would flush the content of the bridge data FIFO. Then, the CPU services the interrupt request accordingly. When the task for the interrupt is completed, normal operation is resumed.

Under this method, there is a great deal of inefficiency in the utilization of CPU cycle time. In the case where all of the transactions in the bridge's data FIFO is flushed, all the transactions initiated by the devices on the secondary bus would have to be re-initiated, resulting in a waste of cycle time. Even in the case where the transactions stored in the bridge's data FIFO are allowed to complete, all other devices would have to wait for the interrupt to clear before normal operation can resume, again causing delay and wasting cycle time.

Therefore it would be desirable to have a method and apparatus for processing interrupt requests from devices on a subordinate bus that can efficiently utilize cycle time and causes minimal delay in processing the transactions from all devices.

SUMMARY OF THE INVENTION

It is therefore an object of the present invention to provide a method and apparatus for efficient handling of transactions and interrupt requests generated by devices on a subordinate bus.

It is another object of the present invention to provide a method and apparatus for allowing normal processing of transactions from devices on a subordinate bus in the servicing of an interrupt request generated by one of the devices on the subordinate bus.

Briefly, the preferred embodiment of the present invention provides a method and apparatus for managing interrupt requests from devices on a subordinate bus. An interrupt request storage area is provided on the bridge device to allow the bridge device to log and track interrupt requests. Once an interrupt request from an interrupting device is logged, all previous transactions from the interrupting device is allowed to complete while no further transactions from the interrupting device is allowed. All other devices operates normally during this time. Once the interrupt request is serviced, the interrupting device is allowed to resume normal operation. By providing a storage area to store the interrupt requests from devices on a subordinate bus, the unprocessed transactions in the bridge device and transactions from all other devices can be processed in an orderly manner.

An advantage of the present invention is that it provides a method and apparatus for efficient handling of transactions and interrupt requests generated by devices on a subordinate bus.

Another advantage of the present invention is that it provides a method and apparatus for allowing normal processing of transactions from devices on a subordinate bus in the servicing of an interrupt request generated by one of the devices on the subordinate bus.

These and other features and advantages of the present invention will be understood upon examining the Figures and reading the following detailed description of preferred embodiment of the invention.

IN THE DRAWINGS

Figure 5:
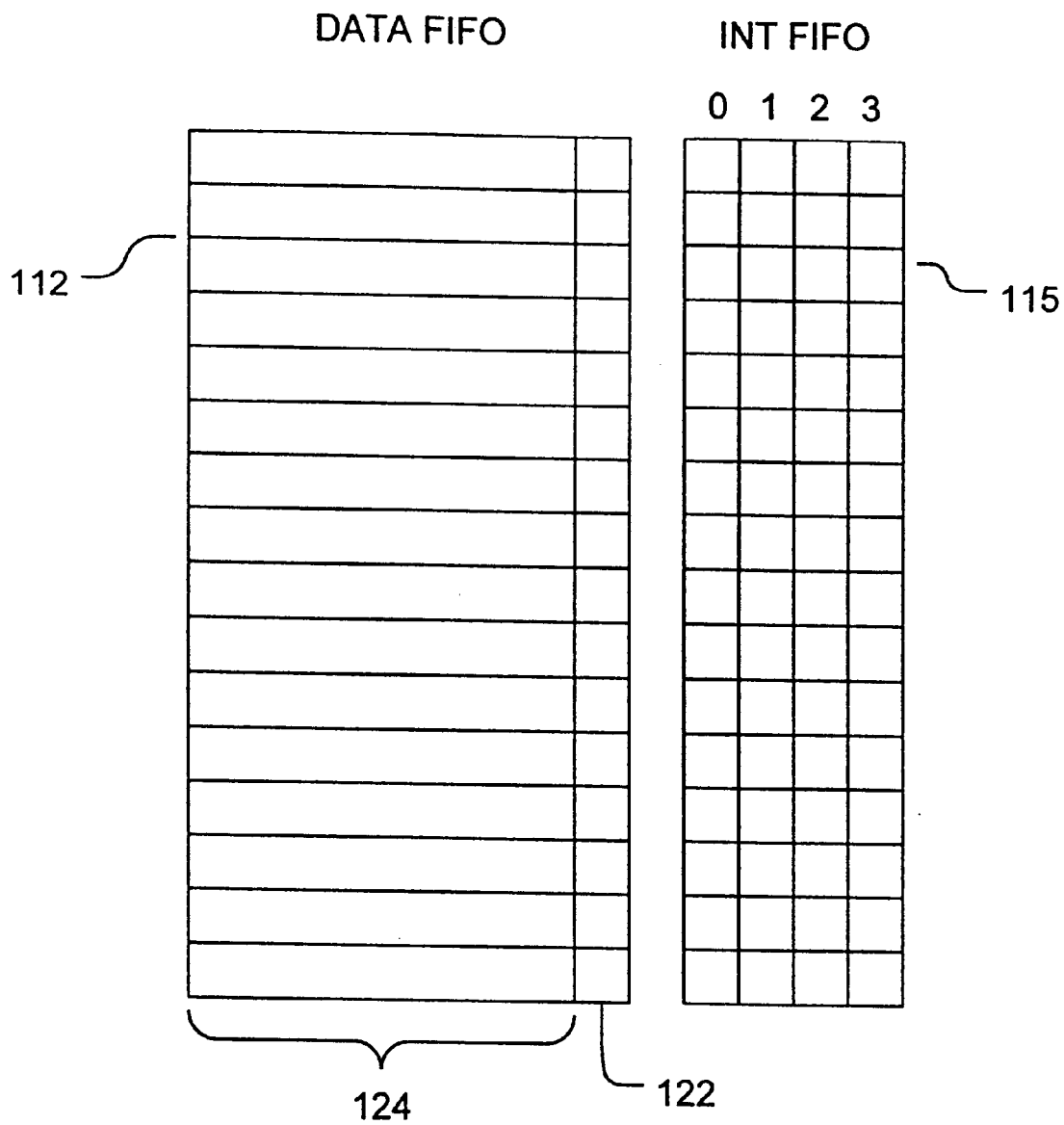
Figure 6:
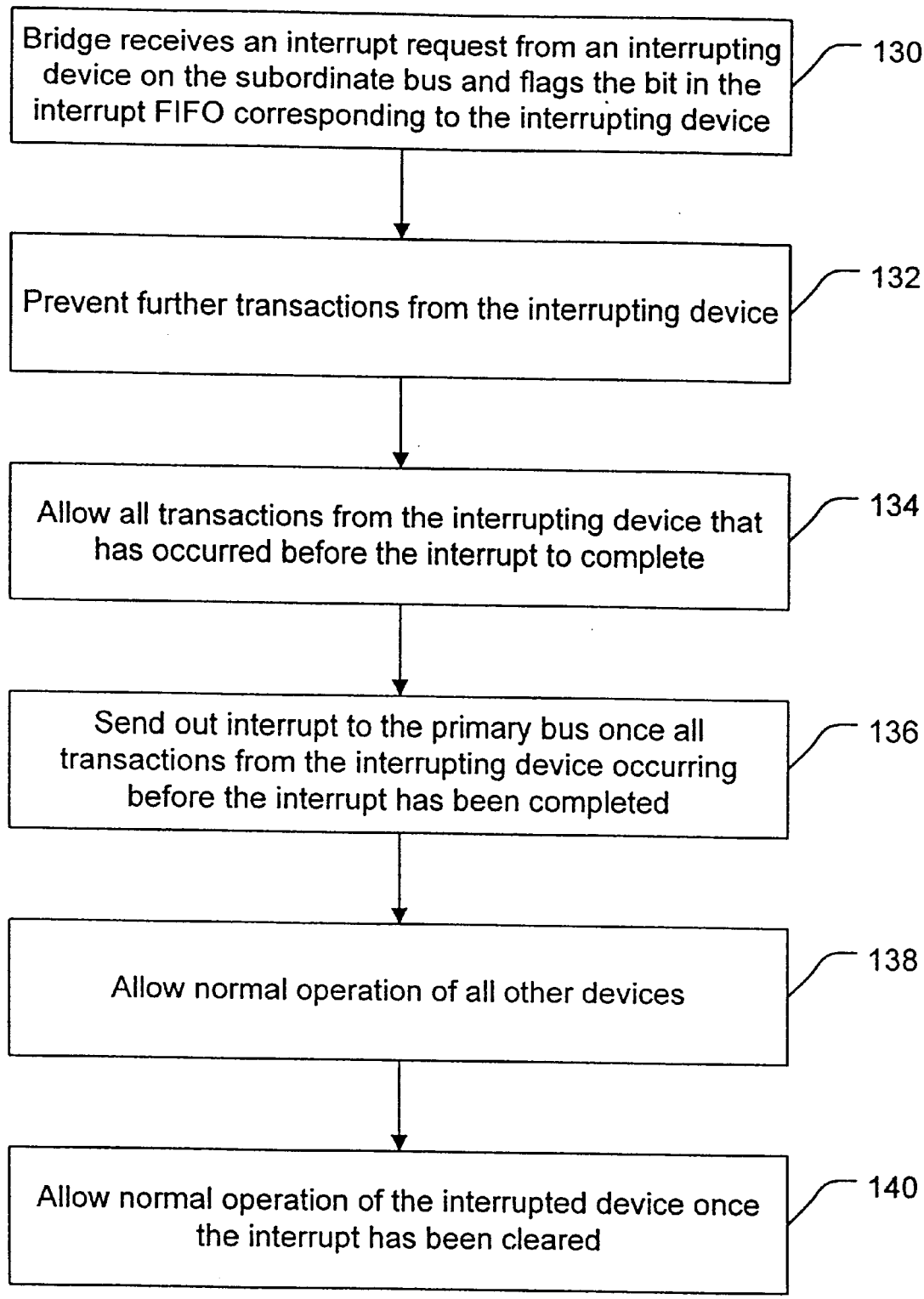
Figure 7:
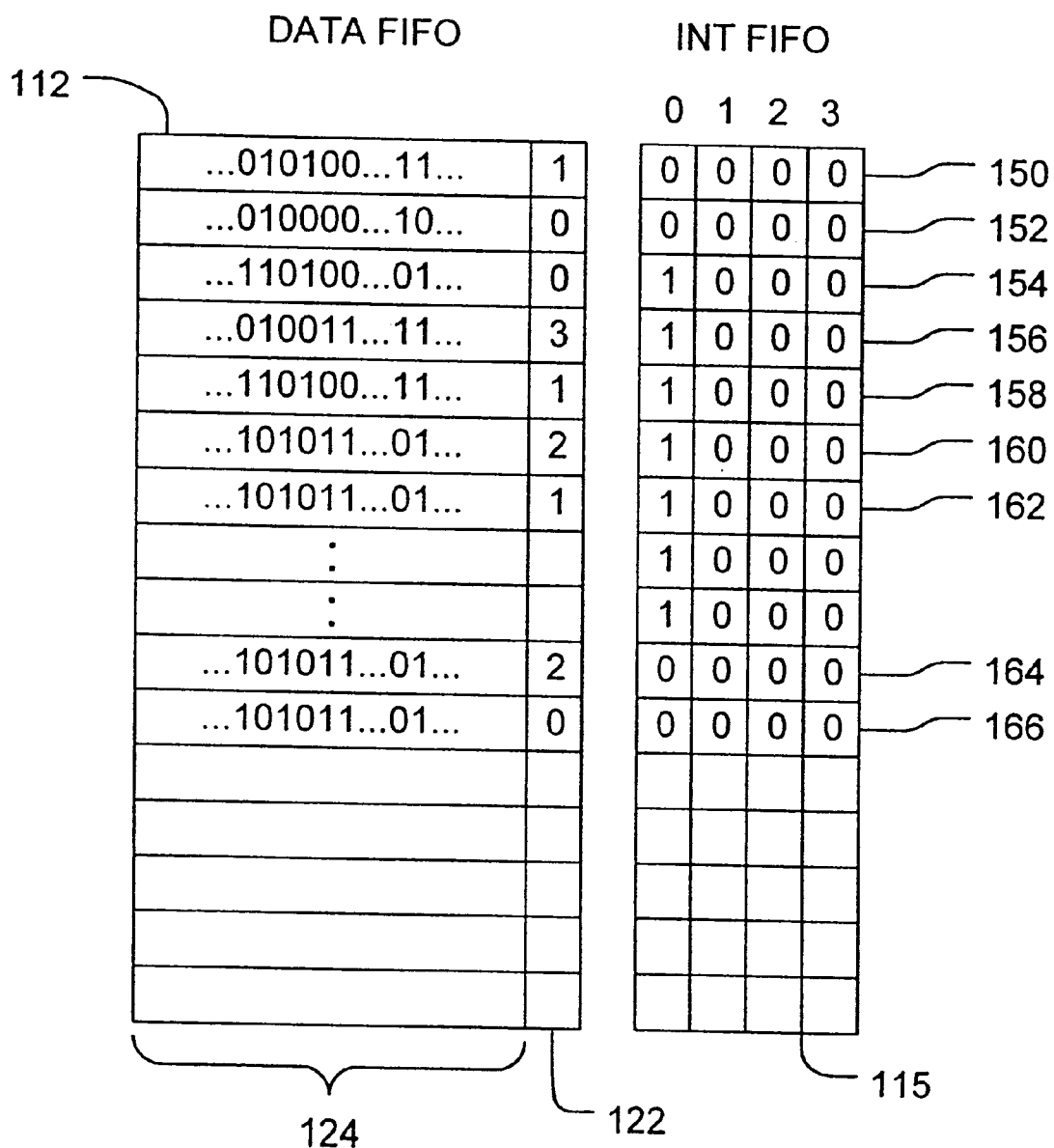

FIG. 5 demonstrates the logical partitioning of the data FIFO and the interrupt FIFO;

FIG. 6 is a flow chart showing the steps in handling interrupt requests from devices on a subordinate bus; and FIG. 7 illustrates an example using the method and apparatus of the preferred embodiment.

DETAILED DESCRIPTION OF THE PREFERRED EMBODIMENTS

Figure 1:
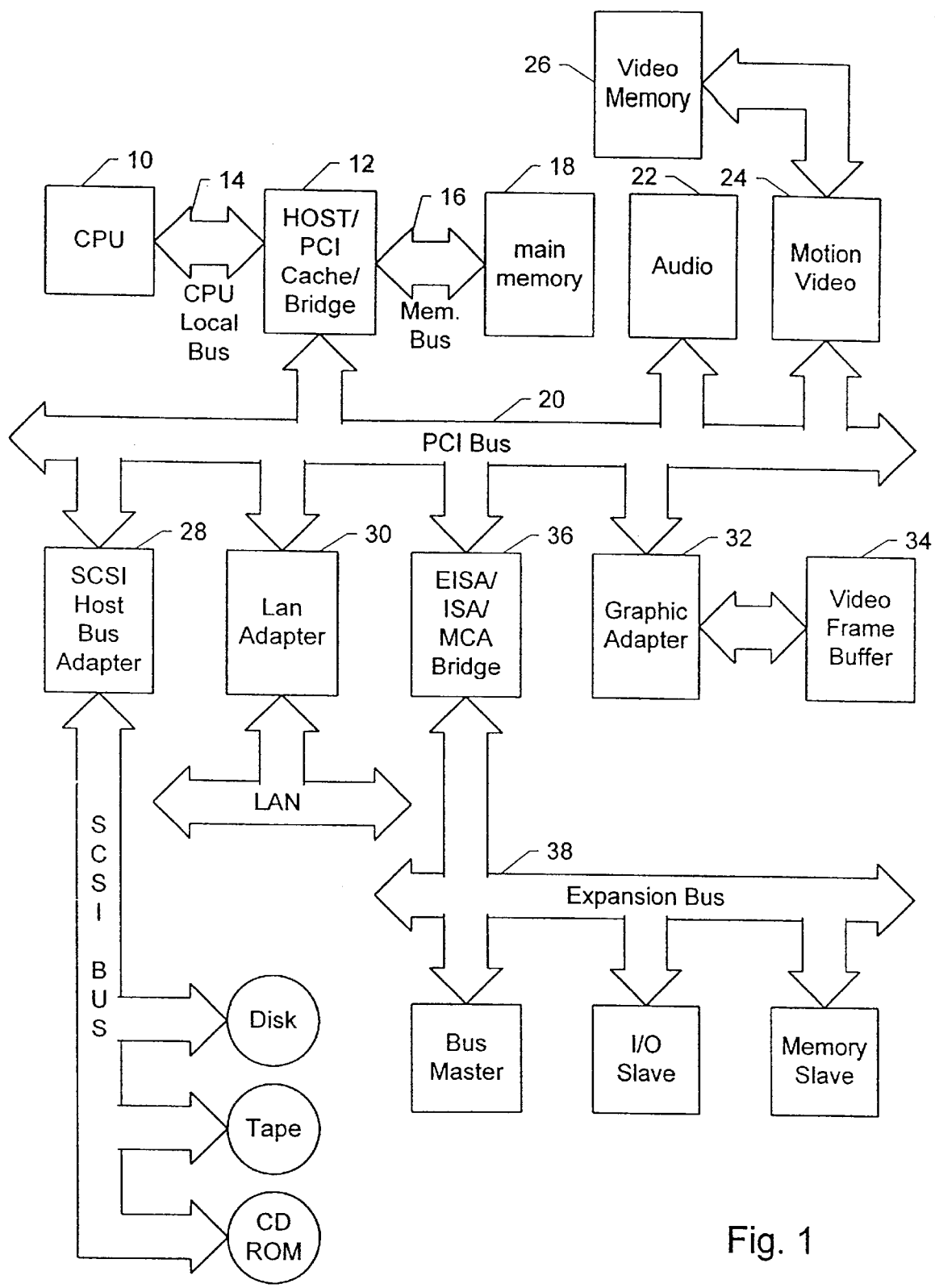
FIG. 1 illustrates an example of a PCI bus architecture in accordance with the PCI Specifications.
Figure 2:
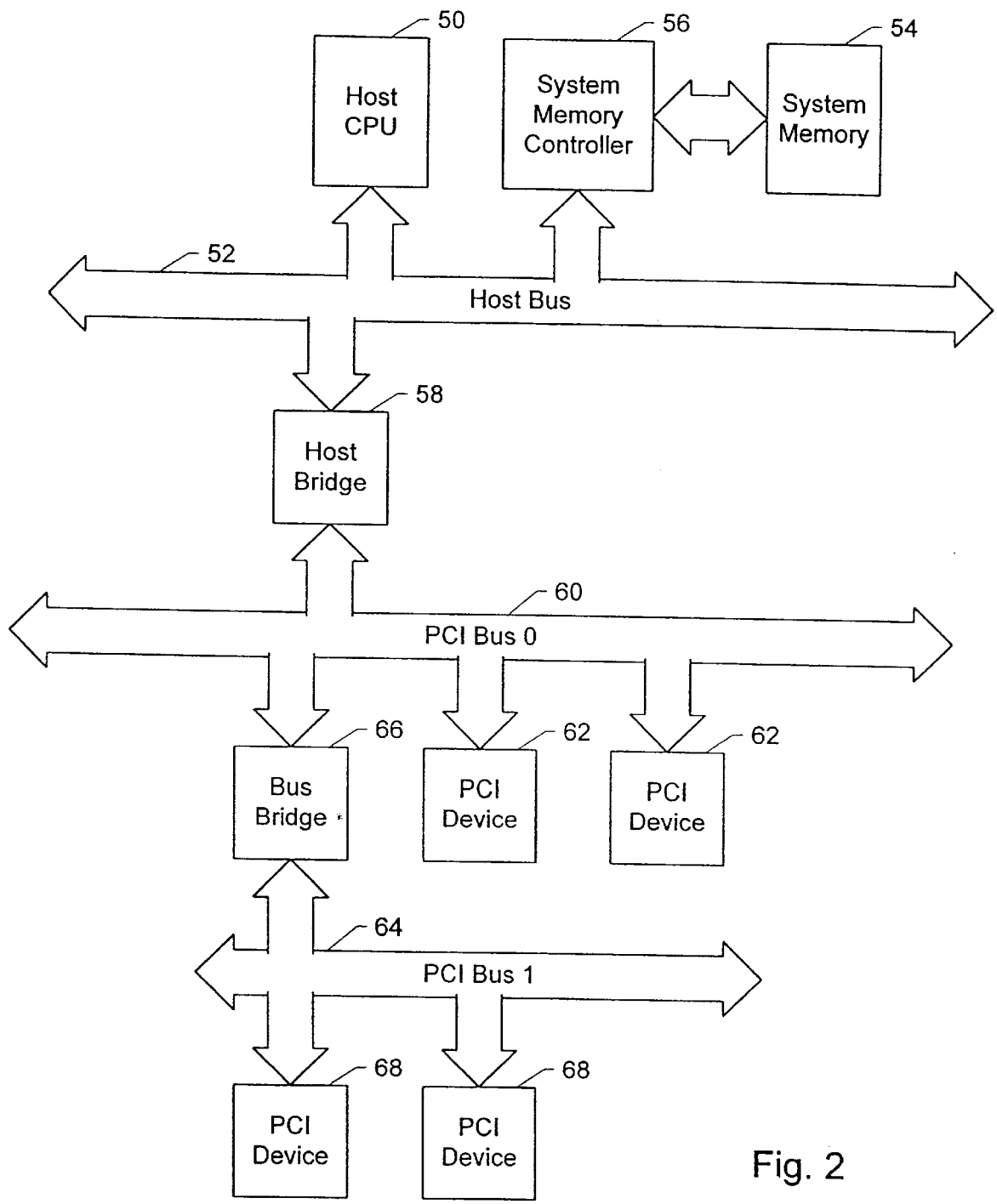
FIG. 2 illustrates an example of multiple level PCI bus architecture whereby the PCI buses communicate with each other via PCI-to-PCI bridges.
Figure 3:
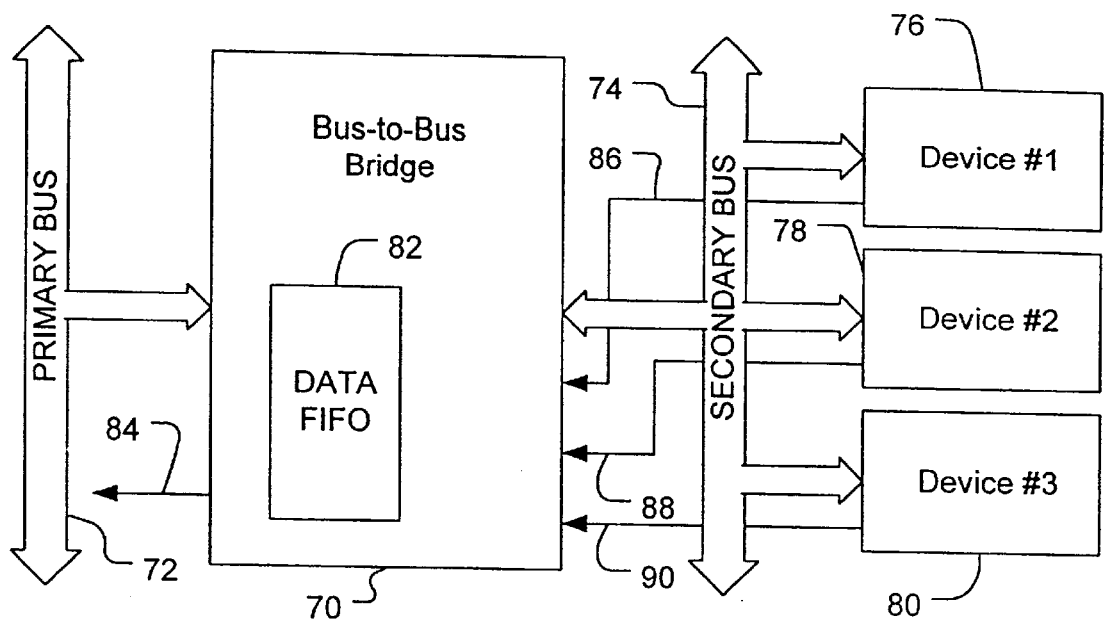
FIG. 3 illustrates a prior art bus bridge architecture having a date FIFO.
Figure 4:
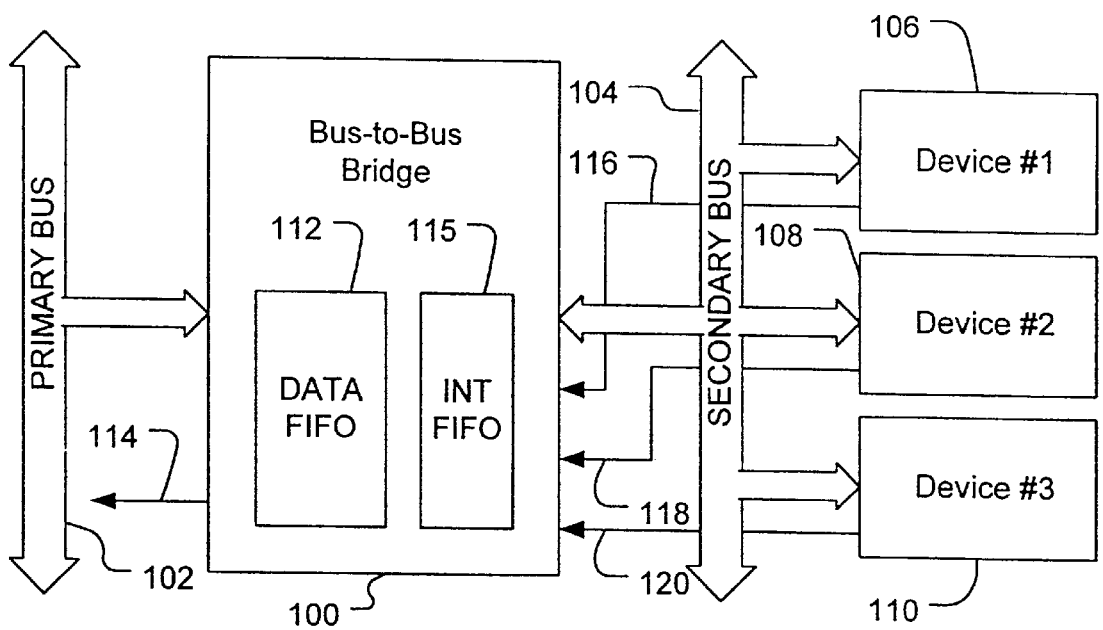
FIG. 4 illustrates a presently preferred embodiment of the present invention for a bus bridge device having a data FIFO and an interrupt FIFO.

Referring to FIG. 4, the arrangement for a presently preferred embodiment of the present invention is illustrated. A bridge device 100 is connected to a primary bus 102 and a secondary bus 104. Each device, 106, 108, or 110, may generate an interrupt request via interrupt lines 116, 118, or 120 respectively. Transactions initiated by devices on the subordinate bus 104 are placed in the data FIFO 112 (as before) and forwarded to the CPU via the primary bus 102. Interrupt requests initiated by devices on the subordinate bus 104 are captured by the bridge device 100 and placed in an interrupt FIFO 115.

By providing an interrupt FIFO 115, interrupts generated by devices on the subordinate buses can be temporarily stored to allow the processing of other tasks and to allow orderly management of the transactions in the data FIFO 112.

Referring to FIG. 5, an illustration of the data FIFO 112 and the interrupt FIFO 115 is provided. The data FIFO 112 is a first-in-first-out type of storage array and the transactions are processed in the order it is stored in the FIFO. It is generally comprised of a number of storage elements each segregated into a first portion 122 and a second portion 124. The first portion provides an indicator as to the device that initiated the transaction. The second portion stores the data of the transaction. The interrupt FIFO 115, being a FIFO storage array, also stores the interrupt requests in the order that is received by the bridge device. For each device on the subordinate bus capable of generating an interrupt request, a bit is reserved. For example, the interrupt FIFO as illustrated shows four bit, each bit corresponding to a device on the subordinate bus. If there are more devices on the subordinate bus, more bits can be provided. Furthermore, other representation of the device numbers can be used as well. For example, the interrupt FIFO may use the bits as binary numbers to correspond to one or more device numbers.

FIG. 6 illustrates a flow chart generally describing the manner in which interrupt requests from devices on a subordinate bus are processed. In a first step 130, the bridge device receives an interrupt request from a device on a subordinate bus and flags the bit in the interrupt FIFO corresponding to the device number of the interrupting device. In the next step 132, the bridge device sets to prevent the interrupting device from initiating any further transactions. This task can be done by disallowing the interrupting device from acquiring the bus. Next, 134, the transactions from the interrupting device still stored in the data FIFO of the bridge device is allowed to complete. Once the transactions from the interrupting device have been completed 136, the interrupt request from the interrupting device is passed to the primary bus and forwarded to the CPU. At this time 138, all other devices except for the interrupting device is operating normally. Finally, 140, when the interrupt request has been serviced and cleared, the interrupting device is allowed to resume normal operation.

Referring to FIG. 7, an example illustrating the method of the presently preferred embodiment in processing an interrupt request is illustrated. The first two transactions in the data FIFO 112, transactions 150 and 152, occurred at a time when there was no interrupt requests. These two transactions will complete under normal operation. Transaction 154 initiated by device #0 along with an interrupt request is logged in the data FIFO 112 and the interrupt FIFO 115. Subsequent to this transaction, device #0 will not be allowed to initiate any transactions while all other devices will operate normally. This is illustrated by transactions 156 to 162 where there is no transaction from device #0. When the interrupt request is cleared, as is indicated by transaction 164, the interrupting device, device #0, is allowed to resume normal operation and can initiate transactions (transaction 166).

Although the present invention has been described in terms of a specific embodiment it is anticipated that alterations and modification thereof will no doubt become apparent to those skilled in the art. It is therefore intended that the following claims be interpreted as covering all such alterations and modifications as fall within the true spirit and scope of the invention

We claim:

1. A method for managing interrupt requests from devices on a subordinate bus, said subordinate bus being connected to a primary bus via a bridge device, a central processing unit being connected to said primary bus for handling transactions and said interrupt requests, comprising the steps of:
   a) receiving an interrupt request from an interrupting device on a subordinate bus;
   b) storing said interrupt request;
   c) disallowing said interrupting device from initiating additional transactions;
   d) completing transactions received from other devices on said subordinate bus and received prior to receiving said interrupt;
   e) processing said interrupt request and additional transactions from said other devices on said subordinate bus; and
   f) allowing said interrupting device to initiate additional transactions when said interrupt request is cleared.

2. A method as recited in claim 1 wherein said interrupt request is stored in an interrupt storage area on said bridge device.

3. A method as recited in claim 1 wherein said disallowing step is accomplished by denying said interrupting device from having access to said subordinate bus.

4. A method as recited in claim 1 wherein transactions from said interrupting device and said other devices are stored in a transaction storage area of said bridge device.

5. A bridge device for managing interrupt requests from devices on a subordinate bus, said bridge device connecting said subordinate bus to a primary bus, a central processing unit being connected to said primary bus for handling all interrupt requests and transactions, comprising:
   means for connecting a subordinate bus with a primary bus;
   means for passing transactions between said subordinate bus and said primary bus;
   a transaction storage area;
   an interrupt request storage area;
   means for capturing and storing an interrupt request from a device on said subordinate bus;
   means for disallowing transactions from said device requesting said interrupt request;
   means for allowing passing of transactions received from other devices on said subordinate bus and received prior to receiving said interrupt request; and
   means for allowing transactions from said device requesting said interrupt request when said interrupt request is cleared.

6. A bridge device as recited in claim 5 wherein said means for disallowing transaction from said device requesting said interrupt request includes a means for flagging said device in said interrupt request storage area.

7. A bridge device as recited in claim 5 wherein said means for allowing transactions from said device requesting said interrupt request when said interrupt request is cleared includes a means for clearing an interrupt flag of said device in said interrupt request storage area.

8. In a computer system having a central processing unit, input/output means, display driver means, a bridge device, and a primary bus connecting said central processing unit to said input/output means, said display driver means, and said bridge device, said bridge device connecting said primary bus to a subordinate bus, said subordinate bus having one or more devices connected thereto, the improvement comprising:
   a) means for receiving an interrupt request from an interrupting device on a subordinate bus;
   b) means for storing said interrupt request;
   c) means for disallowing said interrupting device from initiating additional transactions;
   d) means for completing transactions received from other devices on said subordinate bus and received prior to receiving said interrupt;
   e) means for processing said interrupt request and additional transactions from said other devices on said subordinate bus; and
   f) means for allowing said interrupting device to initiate additional transactions when said interrupt request is cleared.

9. In a computer system as recited in claim 8 wherein said interrupt request is stored in an interrupt request storage area on said bridge device.

10. In a system as recited in claim 8 wherein said disallowing means includes means for denying said interrupting device from having access to said subordinate bus.

11. In a system as recited in claim 8 wherein transactions from said interrupting device and said other devices are stored in a transaction storage area of said bridge device.

* * * * *